UNITED STATES PATENT OFFICE.

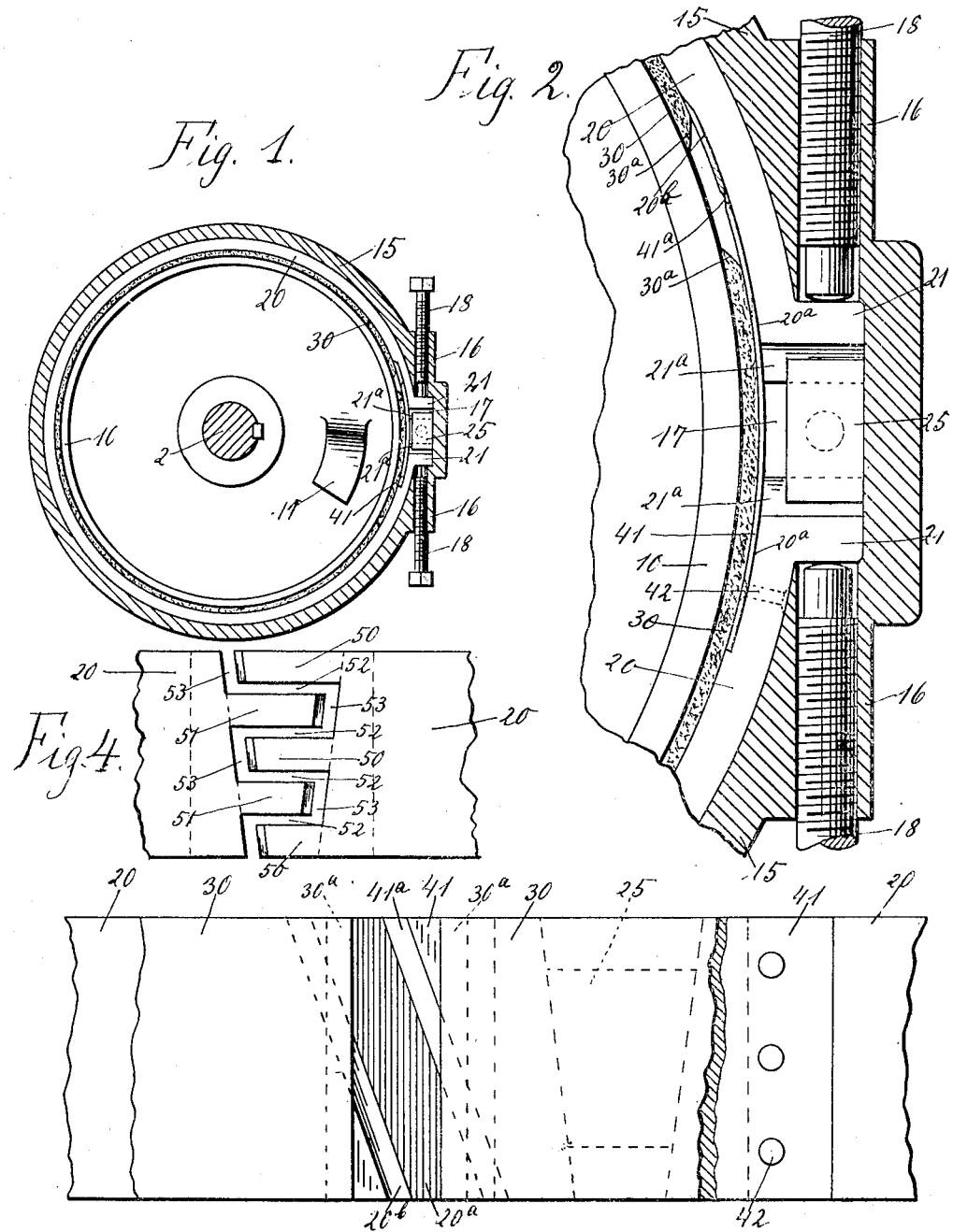

TALBOT C. DEXTER, OF PEARL RIVER, NEW YORK.

FRICTION-CLUTCH.

No. 882,299.  Specification of Letters Patent.  Patented March 17, 1908.

Application filed March 20, 1907. Serial No. 363,410.

*To all whom it may concern:*

Be it known that I, TALBOT C. DEXTER, a citizen of the United States, residing at Pearl River, in the county of Rockland and State of New York, have invented certain new and useful Improvements in Friction-Clutches for Paper-Cutting Machines, of which the following is a specification.

My invention relates to friction clutches of the general character described in Letters Patent No. 815,909, granted to me the 20th of March, 1906, in which a reciprocating power-member imparts movement to a clamping member, through the medium of a friction clutch, with a force limited by the frictional resistance between the members of the said friction clutch.

An element of the friction clutch described in my aforesaid patent is a strap or band of leather or like yielding material surrounding the driving wheel of the clutch to provide an effective friction surface between it and a clamping band on which it operates.

In practice I have found that it is not feasible to attach the strap of leather or the like to either of the metal members between which it is interposed for the reason that rivets or any possible means of attachment between the leather and either of the metal members will not resist the wear and strain to which the parts are subjected and cannot be made to retain the leather strap in fixed position and in smooth form. The leather strap, being free from attachment is of course liable to creep in either direction on the metal surfaces between which it is interposed and consequently one or the other of its ends may be carried over the joint between the ends of the clamping band and interfere therewith, resulting also in injury to the leather strap itself.

My present improvement relates to means by which a friction strap or band of leather or the like interposed between the concentric members of an adjustable friction clutch may be prevented from interfering with the joint between the ends of the adjustable clamping member, while free to move around between the metal surfaces. To this end I arrange means to overlap the joint or opening between the ends of the adjustable clamping member so as to prevent contact of the ends of the leather strap or band with the joint in the clamping member. Said overlapping means may be a single thin blade of steel bridging the opening between the ends of the clamping member, or a series of tongues or fingers or other equivalent, bridging said opening.

In the accompanying drawing Figure 1 is a vertical transverse sectional elevation of a friction clutch such as described in my Patent No. 815,909, with my present improvement applied. Fig. 2 is a detail section on a larger scale, in the same plane as Fig. 1, showing the joint in the clamping band and the adjacent parts of the leather strap and the interposed steel blade. Fig. 3 is a detail in side view of part of the same. Fig. 4 is a similar view, on a smaller scale, of a slight modification.

Using the same reference numerals which designate corresponding parts in my previous patent No. 815909, 15 indicates the outer drum of the clutch which receives reciprocating rotary movement from a crank and pitman, not here shown, as described in my Patent No. 815909, and 10 indicates the inner wheel driven by friction from the clutch drum 15 and keyed on the shaft 2 through which reciprocating motion is imparted to the parts to be operated.

20 indicates the split clamping band of steel within the drum 15, formed with outwardly projecting ends 21 occupying a radial recess or pocket 17 in the drum in position to be forced inwardly by screws 18, tapped in lugs 16 on the drum in order to tighten the clamping band 20 on the inner clutch wheel 10.

25 is a wedge-shaped block, interposed between the outturned ends of the clamping-band 20 and tightened by a screw and nut to form a firm bearing between the ends of the band after the latter has been sufficiently tightened on the clutch-wheel 2 by means of the screws 18 as described in my former patent.

30 indicates the strap of leather or other suitable frictional material interposed between the encircling clamping band 20 and the periphery of the clutch-wheel 10. This leather strap 30 is separated at its ends to a sufficient extent to permit it to follow the clamping movement of the steel band 20 and maintain a smooth and even form on the periphery of the wheel 10.

The purpose of the invention being to permit slip between the clutch members 15 and 10 after the proper pressure has been applied to a pile of paper sheets or other article of uncertain or variable height the interposed friction strap 30 must slip on one or both of the members 20 and 10. In practice it is found best to attach it to neither of these members but leave it free and unconstrained in order that it may maintain a smooth and even condition around the wheel. It is, therefore, liable to creep around the wheel in the oscillating movement of the drum and the space between the ends of the strap will not always correspond in position with that between the ends of the band 20. In order to prevent the ends of the strap 30 being caught in the joint or opening between the ends of the band, I interpose a thin and elastic blade of steel 41 between the clamping band 20 and the friction strap 30 and bridging or covering the space between the ends 21 of the band and fixed to the inside of the band by screws or rivets 42 on one side only of the space between the ends thereof so as to keep it in place while permitting it to slip freely beneath one end of the band to accommodate the clamping movement. The inner surface of the band 20 upon both sides of the opening between its ends is recessed as shown at $20^a$ to receive the blade 41, the depth of the recess being exactly the thickness of the blade 41, and the blade being conformed to the curvature of the inner surface of the band 20. The edge $20^b$ of recess $20^a$ adjacent to the free end of band 41 is chamfered off and extended at an acute angle across the inner face of band 20, as shown; and the adjacent free end $41^a$ of blade 41 is also chamfered or beveled off and extended at an angle parallel with the edge $20^b$ of recess $20^a$. The ends of the friction strap 30 are cut at right angles to its length so as to be presented at angles to the chamfered surface $20^b$ of recess $20^a$ and chamfered edge $41^a$ of blade 41. The ends of strap 30 are also beveled or chamfered inwardly, as shown at $30^a$, (that is oppositely to the chamfers $20^b$ and $41^a$) to further insure against catching or interference between these parts in their relative circular movement.

In place of using the single bridging plate or blade 41 of thin steel, as shown in Figs. 1, 2 and 3 of the drawings, I may employ the means illustrated in Fig. 4 for bridging the space between the ends of the adjustable clamping member. In this modified form of my invention, I provide two series of overlapping tongues or fingers 50 and 51, projecting respectively from the adjacent ends of the split band 20, and separated from each other by the longitudinal spaces 52 and their free ends separated from the adjacent ends of the band by spaces 53. It will be understood that these parallel bridging fingers are conformed to the inner curvature of the split band so as to present smooth continuations of the friction surface of the said band. The free ends of tongues or fingers 50, 51, may be beveled off slightly as shown to further avoid interference with the ends of the friction strap 30. It will, of course, be understood that the friction strap 30 is employed in practically the same manner in this modified form, as above described with reference to Figs. 1, 2 and 3; the ends of strap 30 being presented at slight angles to the ends of tongues or fingers 50, 51, to further avoid interference. The tongues or fingers 50, 51 are graduated in length from side to side of band 20 to properly correspond with the wedge shaped space separating the ends of the band. This modified form of the device shown in Fig. 4 is a simple construction to manufacture, since the band 20 can be cast with the wedge shaped recess separating its outturned ends 21, and the longitudinal spaces 52 separating the tongue portions 50, 51, and the tongues afterwards completed for separating the ends of the band by drilling out suitable openings.

I would have it understood that I do not limit myself to the specific structure of my improved clutch but wish to claim broadly in a clutch of the general type referred to, any and all means for bridging over or overlapping the space separating the ends of the adjustable clamping member so as to avoid the interference with the ends of the strap or band of friction material. I consider it immaterial to the scope of my invention whether the adjustable clamping member is the inner or outer member of the frictional clutch.

It is thought the operation of the clutch will be clear without further explanation.

Having thus described my invention, what I claim as new and desire to secure by Letters Patent is:

1. In a friction clutch, the combination of coöperating clutch members, one of which consists of a band or rim with separated ends, a strap or band of friction material interposed between said clutch members, and means interposed between the strap of friction material and the adjacent ends of the surrounding split band or rim, overlapping said adjacent ends and covering the space between them.

2. In a friction clutch, the combination of the coöperating clutch members, one of which comprises a split band or rim with separated ends, a strap or band of friction material interposed concentrically between said clutch members and having its ends separated, and means overlapping the adjacent ends of the split band or rim, and bridging or covering the space between said ends.

3. In a friction clutch, the combination of a clutch wheel, a coöperating concentrically arranged band or rim with separated ends, a strap or band of friction material interposed between the clutch wheel and the surrounding band or rim, and a blade or finger overlapping the adjacent separated ends of the band or rim, and bridging the space between them for the purpose set forth.

4. In a friction clutch, the combination of a clutch wheel, a clamping band with separated ends encircling the wheel, a strap or band of compressible friction material interposed between the clutch wheel and clamping band, and a blade or finger overlapping and bridging or covering the space between the adjacent ends of the clamping band for the purpose set forth.

5. In a friction clutch, the combination of a clutch wheel, a split clamping band concentric with the wheel, a strap of friction material interposed between the wheel and the split band, means engaging the ends of the split band for securing the band in frictional engagement with the interposed strap, and a blade or finger secured to one end of the split band and projecting toward the other end of the split band, for the purpose set forth.

6. In a rotary friction clutch, the combination of a clutch wheel, a split band encircling the wheel, a strap of friction material interposed between the wheel and the encircling band, adjustable means for clamping the band on the friction strap and wheel with variable friction, and a blade or finger of elastic material covering the space between the adjacent ends of the split band, and attached beneath one of said ends and sliding beneath the other.

7. In a friction clutch, the combination of a clutch wheel, a concentric split band, a strap of friction material interposed between the clutch wheel and the split band, and a blade or finger secured to the working face of one end of the split band and projecting over the space separating said ends and overlapping the other end of the split band, the free end of said blade being chamfered or beveled as set forth.

8. In a friction clutch, the combination of a clutch wheel, a concentric split band having its working face recessed adjacent to its separated ends, a blade or finger secured at one end in said recess and having its free end cut at an oblique angle, and a strap of friction material interposed between the friction wheel and split band and having its ends presented at an angle to the free end of the blade.

9. In a friction clutch, the combination of a friction wheel, a concentric split band having its working face recessed adjacent to its separated ends, the wall at one end of said recess extending at an oblique angle and beveled as shown, a blade or finger secured at one end in said recess and having an angular free end which overlaps the opposite end of the split band and projects adjacent to the said beveled edge of the recess, and a strap of friction material interposed between the friction wheel and the split band, and having its ends presented at angles to the beveled end wall of the recess and the angular end of the blade.

10. In a friction clutch, the combination of a friction wheel, a concentric split band, a blade or finger secured to one end of the band and overlapping the space between the ends of the band, said blade having a beveled free end, and a strip of friction material interposed between the friction wheel and the split band, and having its ends beveled oppositely to the bevel of the blade.

11. In a friction clutch, the combination of an inner clutch wheel, a drum inclosing said wheel, a divided band encircling the wheel, inclosed in the drum and having outturned ends, means for forcing the outturned ends together to clamp the encircling band on the clutch-wheel, a strap of soft friction material interposed between the encircling band and the clutch-wheel and a thin blade of elastic material bridging the space between the ends of the band to exclude the friction strap, substantially as described.

TALBOT C. DEXTER

Witnesses:
A. C. HAMMOND,
G. A. H. LEITCH.